United States Patent
de Ruijter et al.

(10) Patent No.: US 10,389,482 B2
(45) Date of Patent: Aug. 20, 2019

(54) RADIO-FREQUENCY APPARATUS WITH IMPROVED POWER CONSUMPTION AND ASSOCIATED METHODS

(71) Applicant: Silicon Laboratories Inc., Austin, TX (US)

(72) Inventors: Hendricus de Ruijter, Sunnyvale, CA (US); Ping Xiong, Sunnyvale, CA (US); Wentao Li, Mountain House, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/370,693

(22) Filed: Dec. 6, 2016

(65) Prior Publication Data

US 2018/0159658 A1  Jun. 7, 2018

(51) Int. Cl.
    *H04L 1/00* (2006.01)
    *H04L 7/00* (2006.01)
    *H04L 27/22* (2006.01)
    *H04L 7/04* (2006.01)

(52) U.S. Cl.
CPC .......... *H04L 1/0054* (2013.01); *H04L 1/0047* (2013.01); *H04L 7/042* (2013.01); *H04L 27/22* (2013.01)

(58) Field of Classification Search
CPC .......... H04B 1/06; H04B 1/1027; H04B 1/16; H04B 1/7163; H04B 1/71637; H04B 2001/71563; H04B 2001/71566; H04L 1/0054; H04L 27/14; H04L 27/156; H04L 27/1563; H04L 27/1566; H04L 27/22; H04L 27/2273; H04L 27/2275; H04L 27/2276; H04L 27/2331; H04L 27/2335; H04L 27/2338; H04L 27/38; H04L 27/3827; H04L 27/3854; H04L 27/3863; H04L 27/3872; H04L 27/3881; H04L 27/389; H04L 1/0047; H04L 7/00; H04L 7/27
USPC ....... 375/142, 143, 150, 152, 224, 225, 227, 375/260, 262, 265, 316, 324–326, 340, 375/341, 343, 344, 349, 350; 455/67.11, 455/67.13, 68, 71, 134–136, 139, 146.1, 455/146.2, 226.1–226.3; 714/794, 795
See application file for complete search history.

(56) References Cited

U.S. PATENT DOCUMENTS

| | | | |
|---|---|---|---|
| 3,787,863 A | | 1/1974 | Watanabe |
| 4,020,461 A | * | 4/1977 | Adams .................. H03M 13/35 375/283 |
| 4,219,778 A | | 8/1980 | Ishii |

(Continued)

OTHER PUBLICATIONS

U.S. Appl. No. 14/080,402, filed Nov. 2013, de Ruijter.

(Continued)

*Primary Examiner* — Young T Tse
(74) *Attorney, Agent, or Firm* — Law Offices of Maximilian R. Peterson (57) ABSTRACT

An apparatus includes a radio frequency (RF) receiver, which includes a differentiator to differentiate a phase signal to generate a differentiated signal. The RF receiver further includes a correlator coupled to receive and correlate the differentiated signal, and a memory to receive and store the differentiated signal. Samples of the differentiated signal are provided to the correlator and to the memory synchronously.

20 Claims, 10 Drawing Sheets

(56) References Cited

U.S. PATENT DOCUMENTS

| | | | | |
|---|---|---|---|---|
| 4,458,206 | A | * | 7/1984 | Dellande ............... H04L 1/20 329/303 |
| 5,384,564 | A | | 1/1995 | Wycoff |
| 5,450,447 | A | | 9/1995 | Dutta |
| 5,450,477 | A | | 9/1995 | Dutta |
| 5,946,292 | A | | 8/1999 | Tsujishita |
| 6,389,270 | B1 | | 5/2002 | Nohrden |
| 6,438,183 | B1 | * | 8/2002 | Taura ............... H04L 27/2657 375/326 |
| 6,516,028 | B1 | | 2/2003 | Kobayashi |
| 7,212,798 | B1 | | 5/2007 | Adams |
| 7,636,404 | B2 | | 12/2009 | Guo |
| 8,295,404 | B1 | | 10/2012 | Husted |
| 8,711,718 | B2 | | 4/2014 | Su |
| 2002/0145971 | A1 | | 10/2002 | Cho |
| 2005/0100105 | A1 | | 5/2005 | Jensen |
| 2005/0249307 | A1 | | 11/2005 | Yu |
| 2006/0270355 | A1 | | 11/2006 | Mak |
| 2009/0046764 | A1 | * | 2/2009 | Manzi ............... H04J 13/107 375/139 |
| 2009/0060104 | A1 | | 3/2009 | Sher |
| 2009/0180524 | A1 | | 7/2009 | Wang |
| 2010/0128817 | A1 | | 5/2010 | Phillips |
| 2012/0146834 | A1 | * | 6/2012 | Karr ............... G01S 13/325 342/47 |
| 2012/0288040 | A1 | | 11/2012 | Yi |
| 2013/0022148 | A1 | | 1/2013 | Sagi |
| 2013/0278914 | A1 | | 10/2013 | Demarest |
| 2015/0030061 | A1 | * | 1/2015 | de Ruijter ......... G06F 13/4295 375/226 |
| 2016/0353398 | A1 | * | 12/2016 | de Ruijter ......... H04W 56/001 |

OTHER PUBLICATIONS

U.S. Appl. No. 13/949,837, filed Jul. 2013, de Ruijter.
U.S. Appl. No. 15/164,363, filed May 2016, de Ruijter.
U.S. Appl. No. 15/168,080, filed May 2016, de Ruijter.
U.S. Appl. No. 15/370,674, filed Dec. 2016, Xiong.
U.S. Appl. No. 15/472,609, filed Mar. 2017, Zhou.
Iwanami et al., *Sequence Estimation Scheme Using Viterbi Algorithm for Improving Bit Error Rate of Binary Continuous Phase FSK with Limiter Discriminator and Integrate & Dump Filter Detection*, ICCS/ISITA 2002, 5 pgs.
Aulin et al., *Continuous Phase Modulation—Part II: Partial Response Signaling*, IEEE Transactions on Communications, vol. COM:29, No. 3, Mar. 1981, 16 pgs.
Proakis, Digital Communications, Fourth Edition, 289-295 (2001), 8 pgs.
Zhang et al., *Low-Effort High-Performance Viterbi-based Receiver for Bluetooth LE Applications*, 4 pgs.
Office communication in U.S. Appl. No. 15/168,080, dated Jul. 20, 2017, 10 pgs.
Office communication in U.S. Appl. No. 15/370,674, dated Jul. 28, 2017, 13 pgs.
Office communication in U.S. Appl. No. 15/164,363, dated Nov. 9, 2017, 10 pgs.
Office communication in U.S. Appl. No. 15/164,363, dated May 10, 2018, 13 pgs.
Office communication in U.S. Appl. No. 15/168,080, dated Feb. 7, 2018, 18 pgs.
Office communication in U.S. Appl. No. 15/370,674, dated Feb. 22, 2017, 17 pgs.
Office communication in U.S. Appl. No. 15/370,674, dated Jun. 1, 2018, 14 pgs.
Freescale Semiconductor, Inc., *ISDN Universal Digital Loop Transceivers II*, 1995 (16 pgs.), available at https://www.nxp.com/docs/en/data-sheet/MC145421.pdf.
Office communication in U.S. Appl. No. 15/472,609, dated Aug. 31, 2018, 16 pgs.
Office communication in U.S. Appl. No. 15/164,363, dated Sep. 18, 2018, 8 pgs.
Office communication in U.S. Appl. No. 15/370,674, dated Sep. 20, 2018, 13 pgs.
Office communication in U.S. Appl. No. 15/164,363, dated Oct. 19, 2018, 7 pgs.
Office communication in U.S. Appl. No. 15/164,363, dated Nov. 15, 2018, 9 pgs.
Office communication in U.S. Appl. No. 15/168,080, dated Jun. 27, 2018, 12 pgs.
Office communication in U.S. Appl. No. 15/168,080, dated Jan. 23, 2019, 15 pgs.
Office communication in U.S. Appl. No. 15/168,080, dated Mar. 7, 2019, 7 pgs.
Office communication in U.S. Appl. No. 15/370,674, dated Apr. 16, 2019, 16 pgs.
Office communication in U.S. Appl. No. 15/472,609, dated Apr. 25, 2019, 19 pgs.

* cited by examiner

RADIO-FREQUENCY APPARATUS WITH IMPROVED POWER CONSUMPTION AND ASSOCIATED METHODS

TECHNICAL FIELD

The disclosure relates generally to communication apparatus and associated methods. More particularly, the disclosure relates to apparatus for receivers with digital acquisition circuitry that reduces the power consumption of the receiver, and associated methods.

BACKGROUND

With the increasing proliferation of wireless technology, such as Wi-Fi, Bluetooth, and mobile or wireless Internet of things (IoT) devices, more devices or systems incorporate radio frequency (RF) circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry. A variety of types and circuitry for transmitters and receivers are used. Transmitters send or transmit information via a medium, such as air, using RF signals. Receivers at another point or location receive the RF signals from the medium, and retrieve the information. Typically, transmitters transmit coded data via RF signals. Receivers receive, decode, demodulate, etc. the RF signals to retrieve the data.

Some wireless communication standards define a preamble for a wireless packet, which is a predefined data pattern that a receiver can use to detect and settle its control loops. The control loops may include the Automatic Gain Control (AGC), Automatic Frequency Compensation (AFC), and Bit Clock Recovery (BCR). After the receiver detects the end of the preamble, the receiver is prepared to receive a full packet including payload data. Some receivers use a preamble detector to detect the arrival of a frame. In response to the preamble detector signaling the detection of the preamble, the receiver begins looking for the next portion of the frame. In the M-bus frame protocol, this next portion is a synchronization word (SYNC word). Under certain circumstances, the preamble detector can occasionally provide a false trigger, such as when a co-channel continuous wave (CW) tone is received at around sensitivity of the preamble detector, or when certain noise patterns are received.

The description in this section and any corresponding figure(s) are included as background information materials. The materials in this section should not be considered as an admission that such materials constitute prior art to the present patent application.

SUMMARY

A variety of communication apparatus and associated methods are contemplated. According to an exemplary embodiment, an apparatus includes a radio frequency (RF) receiver, which includes a differentiator to differentiate a phase signal to generate a differentiated signal. The RF receiver further includes a correlator coupled to receive and correlate the differentiated signal, and a memory to receive and store the differentiated signal. Samples of the differentiated signal are provided to the correlator and to the memory synchronously.

According to another exemplary embodiment, an integrated circuit (IC) includes an RF receiver, which includes a differentiator to differentiate a phase signal to generate a differentiated signal, a correlator coupled to receive and correlate the differentiated signal to generate a correlated signal, and a memory to receive and store the differentiated signal. The RF receiver further includes a likelihood approximation circuit to apply a transfer function to samples stored in the memory to generate distorted samples for use for decoding information coded in the phase signal.

According to another exemplary embodiment, a method receiving radio frequency (RF) signals includes differentiating a phase signal to generate a differentiated signal. The method further includes correlating the differentiated signal to generate a correlated signal, and receiving and storing in a memory the differentiated signal. Samples of the differentiated signal are provided to the correlator and to the memory synchronously.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication circuitry, such as RF receivers or transceivers. More specifically, the disclosed concepts provide apparatus and methods for receivers with acquisition circuitry with reduced or improved power consumption or dissipation. Because the acquisition circuitry is part of the receive path circuitry of the receiver, the overall power consumption or dissipation of the RF receiver or transceiver is reduced or improved. In exemplary embodiments, the acquisition circuitry may be used in a variety of receivers. Such receivers may use desired modulation schemes, for instance, to implement RF communication using standards or protocols, such as Bluetooth or its variations (e.g., Bluetooth low energy (BLE), BLE long-range (BLE-LR), etc.)

Receivers according to exemplary embodiments have improved sensitivity while using fewer circuit resources (e.g., gate count) and lower power consumption. Receivers according to exemplary embodiments provide a relatively low power consumption acquisition circuitry (e.g., to find the Access Address, sync word, and symbol boundaries), also use a timing tracking loop that shares circuitry with the acquisition circuitry. As a result, fewer circuit resources and hardware are used, which results in lower power consumption.

Figure 1:
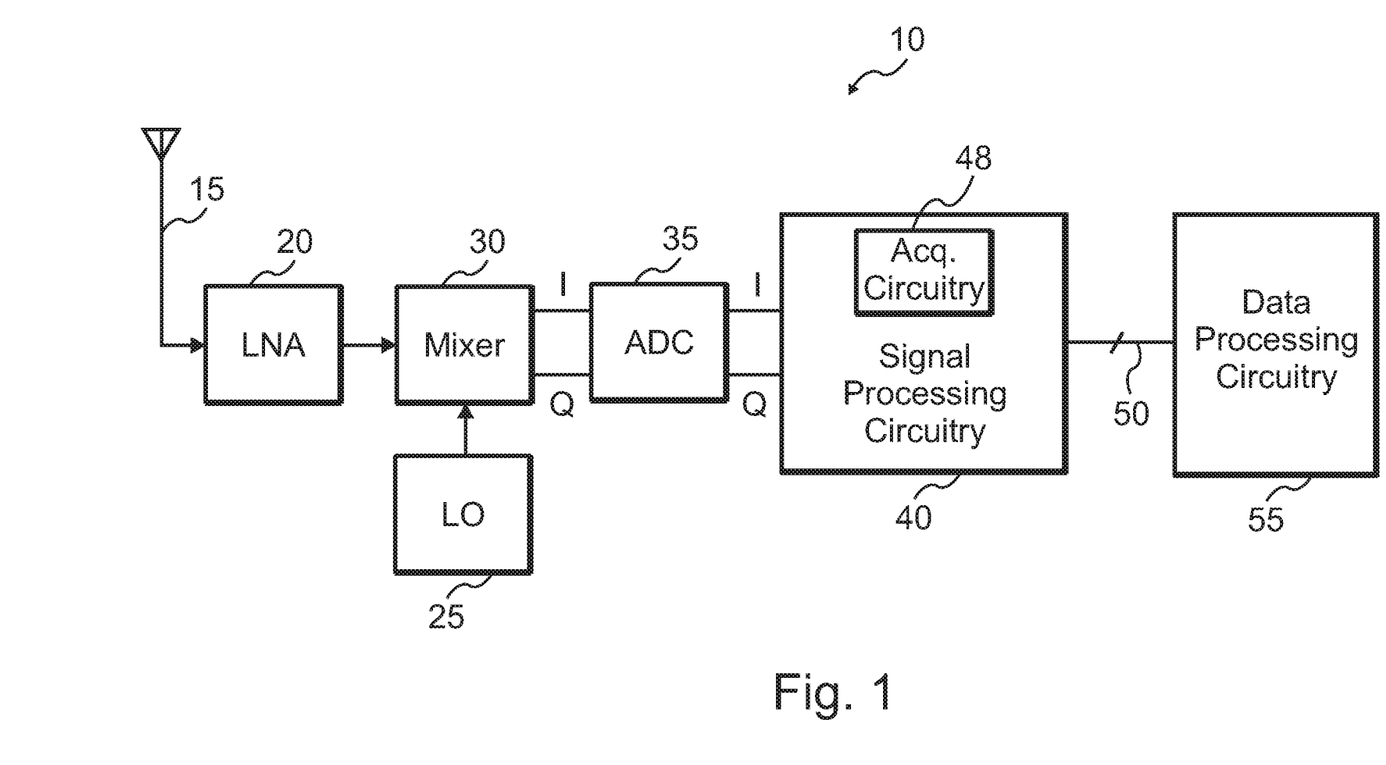
FIG. 1 illustrates a circuit arrangement for a receiver according to an exemplary embodiment.

FIG. 1 illustrates a circuit arrangement for a receiver 10 according to an exemplary embodiment. Receiver 10 receives RF signals via antenna 15. The RF signals feed an input of low noise amplifier (LNA) 20. LNA 20 provides low-noise amplification of the RF signals, and provides amplified RF signals to mixer 30.

Mixer 30 performs frequency translation or shifting of the RF signals, using a reference or local oscillator (LO) frequency provided by LO 25. For example, in some embodiments, mixer 30 translates the RF signal frequencies to baseband frequencies. As another example, in some embodiments, mixer 30 translates the RF signal frequencies to an intermediate frequency (IF).

Mixer 30 provides the translated output signal as a set of two signals, an in-phase (I) signal, and a quadrature (Q) signal. The I and Q signals are analog time-domain signals. Analog to digital converter (ADC) 35 converts the I and Q signals to digital I and Q signals. In exemplary embodiments, ADC 35 may use a variety of signal conversion techniques. For example, in some embodiments, ADC 35 may use delta-sigma (sometimes called sigma-delta) analog to digital conversion.

ADC 35 provides the digital I and Q signals to signal processing circuitry 40. Generally speaking, signal processing circuitry 40 performs processing on the digital I and Q signals, for example, digital signal processing (DSP). In exemplary embodiments, signal processing circuitry 40 includes acquisition circuitry 48. Acquisition circuitry 48, described below in detail, acquires a received signal, i.e., by operating on one or more signals derived from RF signals (e.g., a baseband signal derived from the RF signal) received by antenna 15.

Signal processing circuitry 40 provides information, such as the demodulated data, to data processing circuitry 55 via link 50. Data processing circuitry 55 may perform a variety of functions (e.g., logic, arithmetic, etc.). For example, data processing circuitry 55 may use the demodulated data in a program, routine, or algorithm (whether in software, firmware, hardware, or a combination) to perform desired control or data processing tasks.

In some embodiments, data processing circuitry 55 may perform control of other circuitry, sub-system, or systems (not shown). In some embodiments, data processing circuitry 55 may provide the data (after processing, as desired, for example, filtering) to another circuit (not shown), such as a transducer, display, etc.

In exemplary embodiments, link 50 may take a variety of forms. For example, in some embodiments, link 50 may constitute a number of conductors or coupling mechanisms, such as wires, cables, printed circuit board (PCB) traces, etc. Through link 50, signal processing circuitry 40 and data processing circuitry 55 may exchange information, such as the demodulated data, control information or signals, status signals, etc., as desired.

Figure 2:
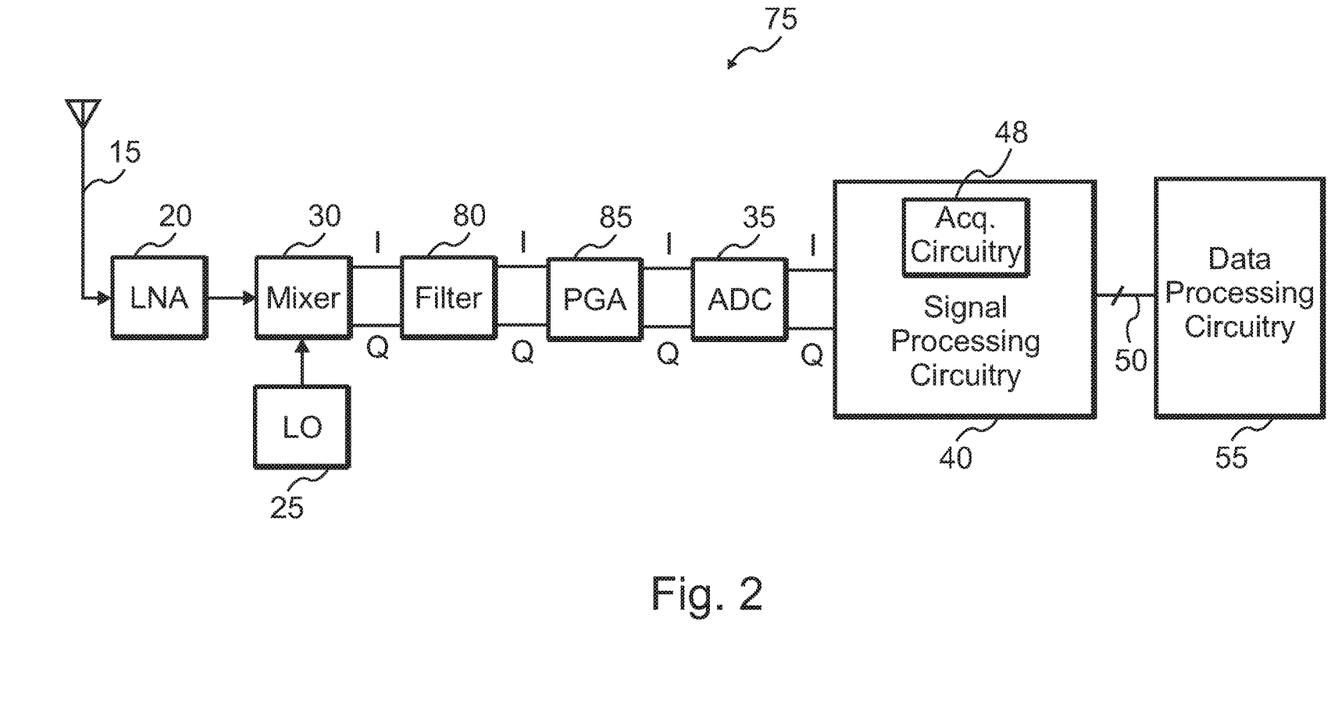
FIG. 2 depicts a circuit arrangement for a receiver according to an exemplary embodiment.

FIG. 2 depicts a circuit arrangement for a receiver 75 according to an exemplary embodiment. Receiver 75 generally has a similar architecture as receiver 10 (see FIG. 1).

Thus, similar to the receiver in FIG. 1, receiver 75 in FIG. 2 includes acquisition circuitry 48. Referring again to FIG. 2, receiver 75 includes a filter 80 and a programmable gain amplifier (PGA) 85. Filter 80 provides filtering of the RF or baseband signal at the output of mixer 30. PGA 85 provides programmable gain for the filtered signal at the output of filter 80.

In some embodiments, PGA 85 has a gain that is programmable for different input levels of the RF signals received by antenna 15 and may be controlled by an automatic gain control (AGC) circuitry. In some embodiments, PGA 85 has a gain that is programmable for different frequency bands of the RF signals received by antenna 15. In some embodiments, PGA 85 may include more than one stage of amplification, for example, two or more "slices" of amplifier circuitry coupled in a cascade configuration, as desired. The gain of the various stages may be programmed in a similar or independent manner, as desired.

Note that variations of receiver 75 are possible and contemplated in exemplary embodiments. For example, in some embodiments, receiver 75 may include filter 80, but not PGA 85. Conversely, as another example, in some embodiments, receiver 75 may include PGA 85, but not filter 80. Conversely, as yet another example, in some embodiments, receiver 75 may swap the order of PGA 85 and filter 80. Other possibilities exist, for example, including one or more filters between antenna 15 and LNA 20 to facilitate accommodating several RF signal bands, etc.

Figure 3:
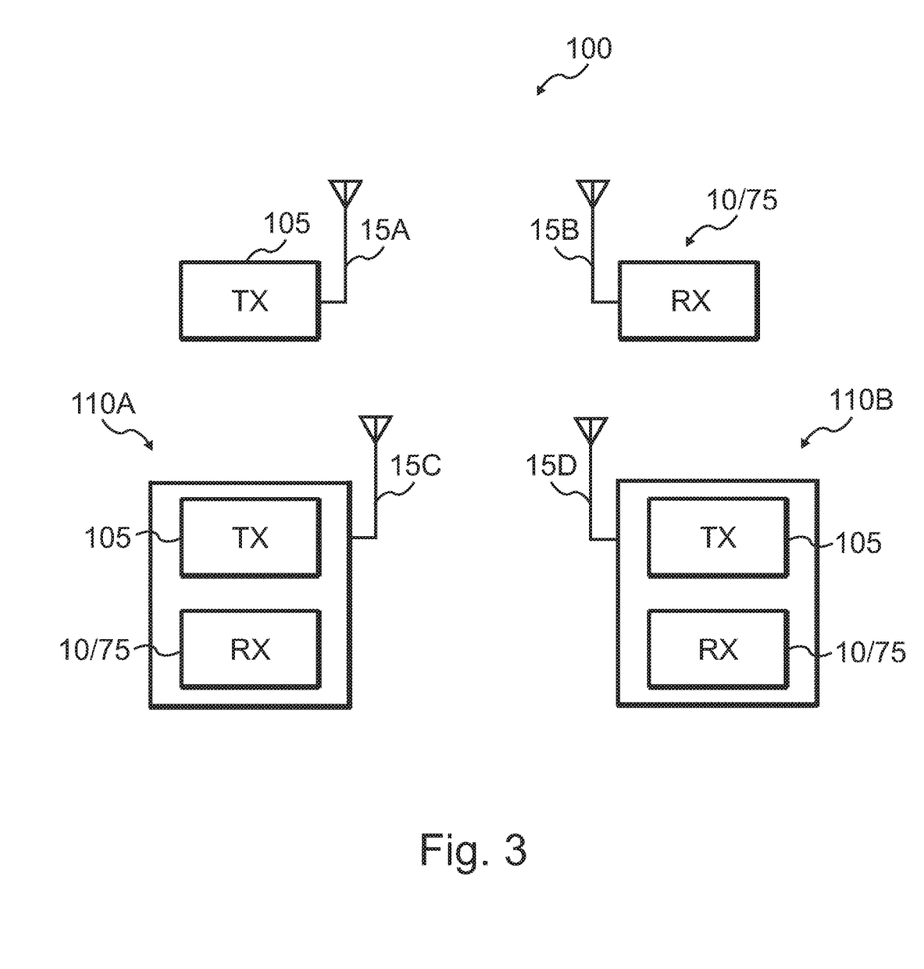
FIG. 3 shows a system for radio communication according to an exemplary embodiment.

Receivers according to exemplary embodiments may be used in a variety of communication arrangements, systems, sub-systems, networks, etc., as desired. FIG. 3 shows a system 100 for radio communication according to an exemplary embodiment.

System 100 includes a transmitter 105, coupled to antenna 15A. Via antenna 15A, transmitter 105 transmits RF signals. The RF signals may be received by receiver 10, described above (alternatively, the receiver may constitute receiver 75, also described above). In addition, or alternatively, transceiver 110A and/or transceiver 110B might receive (via receiver 10 or 75) the transmitted RF signals.

In addition to receive capability, transceiver 110A and transceiver 110B can also transmit RF signals. The transmitted RF signals might be received by receiver 10 or 75, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 110A and transceiver 110B) might form a network, such as an ad-hoc network. As another example, in some exemplary embodiments, transceiver 110A and transceiver 110B might form part of a network, for example, in conjunction with transmitter 105.

Referring again to FIGS. 1-2, acquisition circuitry 48 operates on a signal, typically a baseband signal, or on a signal or a set of signals derived from the baseband signal. The baseband signal is derived from RF signals received in receiver 75 in FIGS. 1-2 or in a receiver using other circuitry, as desired. In exemplary embodiments, including for example the circuitry in FIG. 4 or in FIG. 5, a correlator operates directly on the received signal, i.e., before the received signal is stored in a memory and then the stored data from the memory is used in a correlation process. This operation entails using an address pointer that is used to operate a demodulator using data in the memory.

To accommodate use of an address pointer in such an operation, the memory is populated with samples derived from the received signal synchronously with applying the received signal samples to a correlator. The address pointer, used for selecting the symbol centers, can be derived from the time that the correlator output reaches a correlation peak, which is expected to occur within a few samples after the correlation output exceeds a threshold. With this technique the load (e.g., access, write, and read operations) on the memory is reduced. As a consequence, the power consumption of the memory and, thus, of the receiver overall, is reduced or improved.

Figure 4:
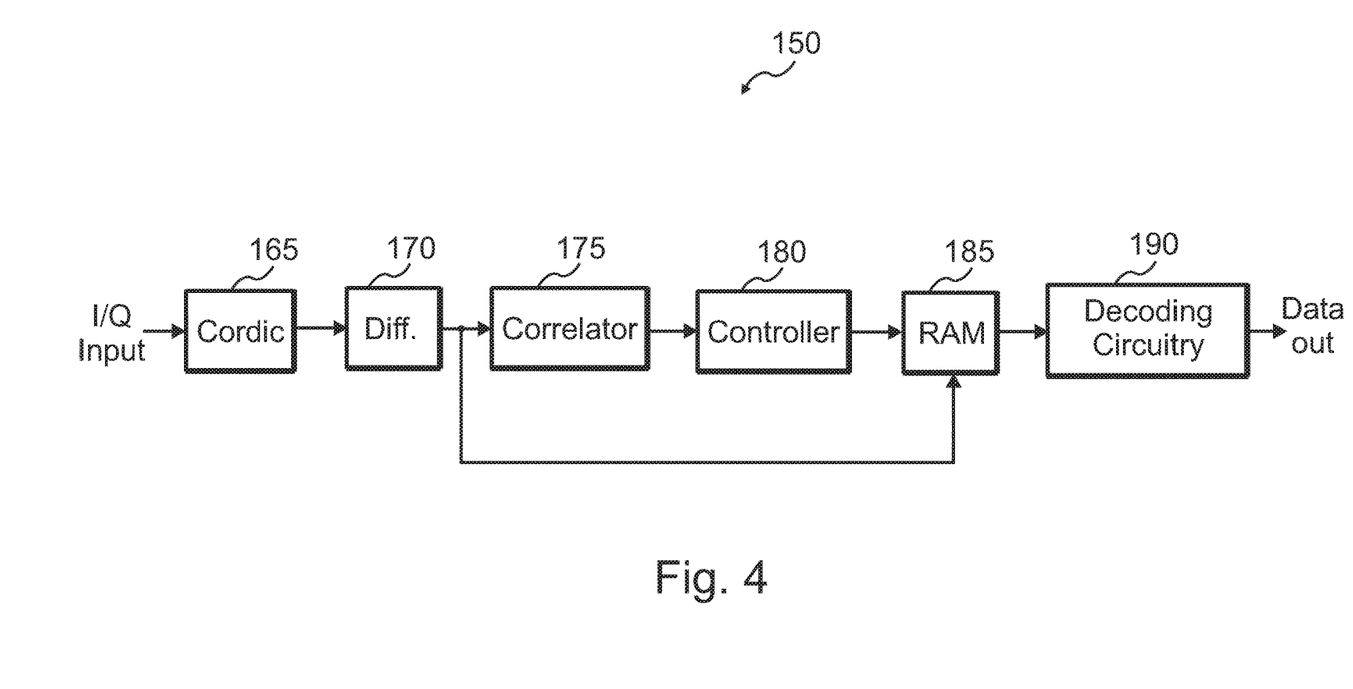
FIG. 4 depicts a circuit arrangement for receive path circuitry according to an exemplary embodiment.

FIG. 4 depicts a circuit arrangement 150 for receive path circuitry according to an exemplary embodiment. The receive path circuitry may be included in a variety of RF receivers, such as the receivers shown in FIGS. 1-2, as desired. Referring again to FIG. 4, the receive path circuitry includes acquisition circuitry. The acquisition circuitry provides a mechanism for signal acquisition in receives according to exemplary embodiments. Signal acquisition, or acquisition, as persons of ordinary skill in the art will understand, involves starting or operating various parts of the receiver to obtain a lock on the received signal (e.g., the received preamble and/or time synchronization elements).

The receive path circuitry in FIG. 4 includes a Coordinate Rotation Digital Computer (Cordic) (or Cordic circuit) 165, which is known to persons of ordinary skill in the art. Cordic 165 receives an in-phase (I) signal and a quadrature (Q) signal. Together, the I and Q signals form a complex signal, such as a baseband signal. Cordic 165 converts the complex signal received at its input into a polar signal, i.e., a complex signal that has a phase component or phase signal and a magnitude component or magnitude signal.

Differentiator 170 differentiates the phase output signal of Cordic 165 to generate a differentiated signal (a frequency signal). Note that in exemplary embodiments differentiator 170 operates over symbol intervals at an oversampled rate, not the data rate.

Differentiator 170 provides the differentiated signal to correlator 175 and to memory 185. In the embodiment shown, the memory is a random access memory (RAM), although other types of memory may be used by making appropriate modifications to accommodate such memories, as persons of ordinary skill in the art will understand.

Correlator 175 performs a correlation process or function on the output signal of differentiator 170, as described below in detail. The results of the correlation process are provided as output signals to controller 180. Controller 180 derives address signals from the output signals of correlator 175. The address signals are used to address locations in RAM 185. As noted above, RAM 185 holds or stores the output signals or data from differentiator 170. Typically, RAM 185 contains oversampled data (multiple samples per symbol) so that symbol timing recovery entails positioning the address pointer to the center of the symbols. The address signals are used to retrieve or fetch data or information from corresponding locations in RAM 185.

The output signals from RAM 185, i.e., the retrieved data or information, are provided to decoding circuitry 190. Decoding circuitry 190 decodes the retrieved data or information to produce the payload or data transmitted from a transmitter (i.e., the data included in the RF signal that the receiver receives via a medium.

In exemplary embodiments, decoding circuitry 190 includes circuitry such as a Viterbi decoder. Furthermore, in exemplary embodiments, controller 180 optionally controls or configures or supervises some or all aspects of the operation of other blocks of circuitry in the receive path circuitry, for example, the operation of decoding circuitry 190, etc. In exemplary embodiments, controller 180 may be implemented as a finite-state machine (FSM), as desired. Other implementations of controller 180 are also contemplated and possible. Examples include general logic circuitry, processors, custom logic, etc.

Considering again the circuit arrangement in FIG. 4, in some embodiments, a channel filter (not shown) may be used in the receive path circuitry. Such a channel filter would be coupled to provide the complex baseband signal to the input of Cordic 165. The channel filter would digitally filter (e.g., low-pass filtering) its input signal (e.g., the baseband signal), which results from the processing of a received RF signal. The digital filtering in the channel filter can in some situations improve the performance of the RF receiver, for example, by filtering noise, adjacent channel signals, etc., or can selectively provide a signal in a desired channel to Cordic 165.

Figure 5:
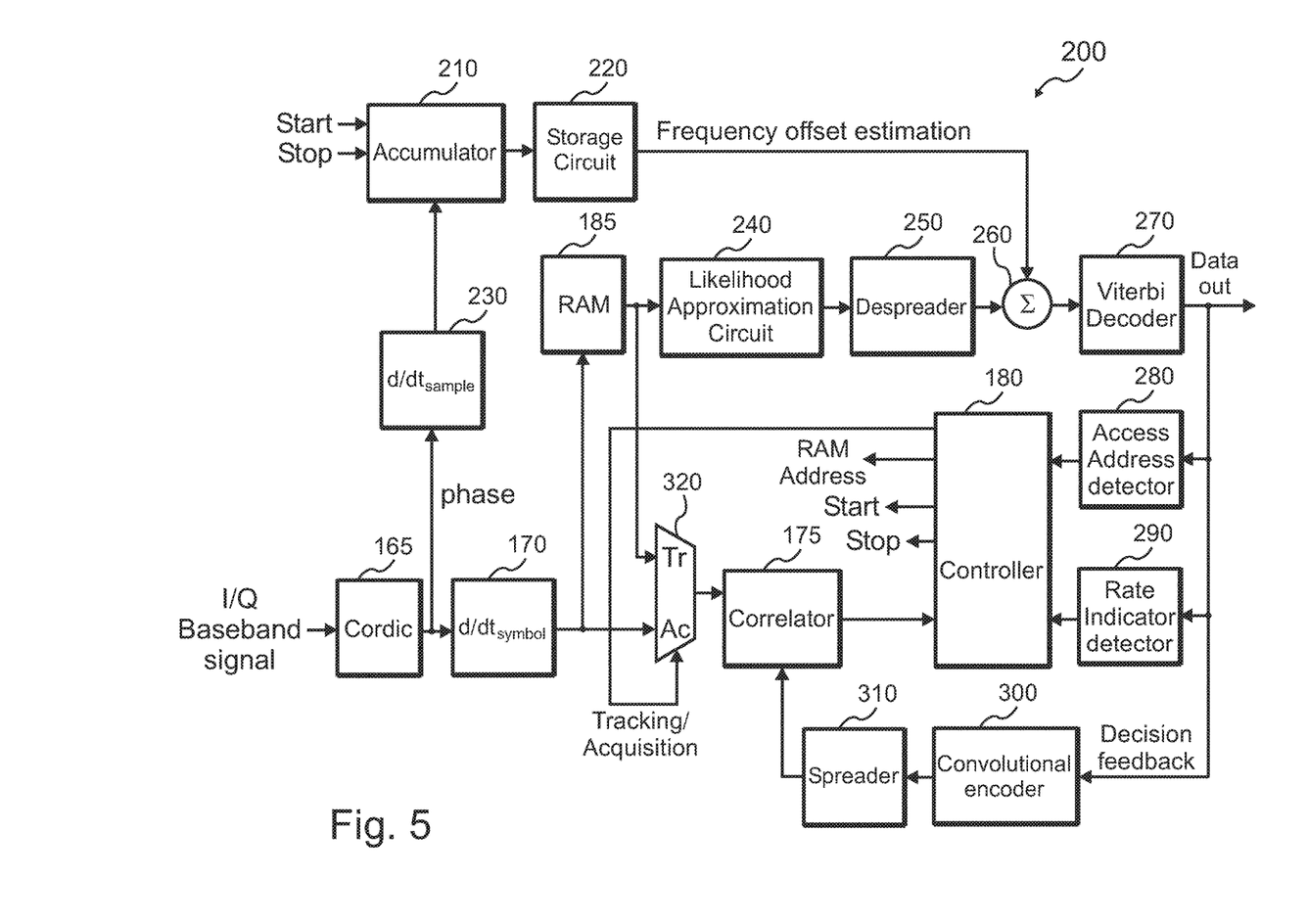
FIG. 5 illustrates a circuit arrangement for receive path circuitry according to an exemplary embodiment.

FIG. 5 depicts a circuit arrangement 200 for receive path circuitry according to an exemplary embodiment. Compared to the circuit arrangement in FIG. 4, circuit arrangement 200 provides additional blocks of circuitry to facilitate signal acquisition and tracking. For instance, the circuitry in FIG. 5 may be used to implement a receiver for receiving BLE-LR signals. The circuitry in FIG. 5 may be used for multiple operations, such as tracking and acquisition. Thus, a receiver using the circuitry in FIG. 5 has an acquisition mode and a tracking mode. Controller 180 facilitates or controls or supervises the operations of the various blocks in each mode of operation of the receiver.

Referring to FIG. 5, the phase output signal of Cordic 165 drives the input of differentiator 230. Differentiator 230 is labeled "d/dt$_{sample}$" to denote that it differentiates on a sample-by-sample basis (as opposed to differentiator 170, labeled "d/dt$_{symbol}$" to denote that it differentiates on a symbol-by-symbol basis, or differentiates over a symbol period at an over-sampled rate).

The output of differentiator 230 drives the input of accumulator 210. Accumulator 210 stores the results of differentiation (which includes subtraction of adjacent samples) by differentiator 230. Accumulator 210 operates in response to "Start" and "Stop" signals that controller 180 provides. In response to the "Start" signal, accumulator 210 stores results of differentiation by differentiator 230 over a period of time. In response to the "Stop" signal, accumulator 210 stops the accumulation process, and provides the result of the accumulation process, a frequency offset, to storage circuit 220. Storage circuit 220 stores the frequency offset value, and provides that value as a frequency offset estimate to adder 260. Accumulator 210 may also be implemented by other averaging techniques, such as a finite impulse response (FIR) filter.

As noted above, differentiator 170 provides the results of symbol-by-symbol differentiation synchronously (e.g., with reference to a clock signal used to clock various circuit blocks in circuit arrangement 200) to correlator 175 and RAM 185. More specifically, differentiator 170 provides the results of symbol-by-symbol differentiation to RAM 185 for storage and also to multiplexer (MUX 320). The output data or signals from RAM 185 drive an input of MUX 320. As noted above, controller 180 generates "RAM Address" signals used to address the contents of RAM 185. In response to a Tracking/Acquisition control signal from controller 180, MUX 320 provides to correlator 175 the output data or signals from either differentiator 170 or RAM 185. More specifically, in the acquisition mode, MUX 320 provides to correlator 175 the output signals or data from differentiator 170. In the tracking mode, MUX 320 provides to correlator 175 the output signals or data from RAM 185.

Correlator 175 processes the signals provided by MUX 320. To do so, correlator 175 receives the output signal of spreader 310. The output signal of spreader 310 represents the expected received signal, i.e., what the receiver expects to receive via a transmission medium (e.g., air). Spreader 310 operates on the output of convolutional encoder 300, as described below in detail.

In exemplary embodiments, correlator 175 includes one or more finite impulse response (FIR) filters. In such an arrangements, the output signal of spreader 310 constitutes the coefficients for the FIR filter(s). Correlator 175 operates on signals provided by MUX 320 to produce an output signal that is provided to controller 180. During the correlation process, the output of correlator 175 crosses a threshold. Thereafter, correlator 174 continues operation for several more cycles to find a maximum correlation value. Typically, the maximum value should appear within half a symbol, e.g., when the oversampling ratio is 4 (four samples per symbol), then two more cycles should be evaluated to find the maximum correlation.

When the maximum correlation value is found, controller 180 calculates the RAM address or address pointer from the RAM address that was used to store the last sample that caused the maximum correlation value. In a BLE-LR receiver (a receiver to receive and process (e.g., demodulate, decode, etc.) signals according to the BLE-LR standard or protocol), controller 180 retrieves samples from RAM 185 at the beginning or before the Access Address.

Samples retrieved from RAM 185 are processed by likelihood approximation (LA) circuit 240. The operation of LA circuit 240 is described below in detail. The output signal of LA circuit 240 drives despreader (or Manchester despreader) 250. Given that BLE-LR signals are Manchester coded, LA circuit 240 and despreader 250 examines samples retrieved from RAM 185 to establish a likelihood of a received Manchester symbol being a binary 1 or binary 0.

In some embodiments, despreader 250 may be implemented using an FIR filter. In such an implementation, assuming that the sample rate is the same as the chip rate, the filter coefficients would be 0, 0, 1, 1 (this configuration would be appropriate for BLE-LR, where 4 chips are used to construct a Manchester symbol, although other configurations may be used, as persons of ordinary skill in the art will understand). If the input of despreader 250 is −1, −1, +1, +1 (0011), then the output of despreader 250 would be 4. On the other hand, if the input of despreader 250 is input is +1, +1, −1, −1 (1100), then the of despreader 250 would be −4.

Adder 260 adds the output signal of despreader 250 to the output signal of storage circuit 220. Storage circuit 220 carries an estimate of the frequency offset. As a result, the output of adder 260 produces a sum signal free or substantially free (within practical limits for a physical implementation) from frequency offset. The sum signal is provided to Viterbi decoder 270. Thus, samples from RAM 185 are processed by LA circuit 240, Manchester despreader 250, and a convolutional decoder. In the exemplary embodiment in FIG. 5, Viterbi decoder 270 functions as a convolutional decoder.

Viterbi decoder 270, together with convolutional encoder 300, form a timing tracking loop. More specifically, Viterbi decoder 270 decodes the bitstream in the signal received from adder 260 to demodulate the received signal. At its input, Viterbi decoder 270 receives "soft code," i.e., symbols provided to Viterbi decoder 270 are not necessarily binary 0 or binary 1. Viterbi decoder 270 uses information on multiple bits to make decisions regarding one bit of data, i.e., to determine whether a given bit is binary 0 or binary 1. Put another way, Viterbi decoder 270 is fed with different "soft" symbols and makes decisions based on symbols that arrive first and later (the value of the first symbol is decoded based on the first "soft" symbol and several "soft" symbols arriving later). When one symbol is decoded, an additional "soft" symbol is shifted in, and a second symbol is decoded or detected based on a number of subsequent "soft" symbols, for example, four "soft" symbols.

Viterbi decoder 270 provides at its output demodulated data or signals (labeled as "Data out" in FIGS. 4-5). The output signal of Viterbi decoder 270 is fed back to convolutional encoder 300 as a "decision feedback" signal. That signal allows convolutional encoder 300 to adapt to the content of a frame of data. More specifically, the "decision feedback" signal is used to facilitate the recoding of the data output by Viterbi decoder 270. In exemplary embodiments, Viterbi decoder 270 may be replaced with any other decoder that performs MLSE. An example of another MLSE algorithm is published by Schalkwijk, Vinck and Post, "Syndrome decoding of binary rate kin convolutional codes," IEEE Transactions on Information Theory (1978), as known to persons of ordinary skill in the art.

The output signals from Viterbi decoder 270 drive the inputs of Access Address detector 280, Rate Indicator detector 290, and convolutional encoder 300 (in the form of the "Decision feedback" signal, as described above). Access Address detector 280 detects the BLE-LR Access Address (similar to a SYNCH word in Bluetooth). Access Address detector 280 provides an indication of the detection to controller 180 as an output signal. Rate Indicator detector 290 detects the Rate Indicator (an indication of whether Manchester spreading in BLE-LR is enabled or disabled) transmitted by the transmitter. Rate Indicator detector 290 provides an indication of the detection to controller 180 as an output signal. Once the Access Address is detected, the Code Indication (CI) field is detected. During the reception of the Payload Data Unit (PDU), Manchester despreader 250 is bypassed (or disabled) or enabled based on the CI field.

To track timing errors, circuit arrangement 200 uses the "Decision feedback" signal to drive correlator 175. More specifically, when a convolutional code is used, for example, for the purpose of FEC, then convolutional encoder 300 is used to recode the output signals of Viterbi decoder 270. The output signal of convolutional encoder 300 drives the input of spreader 310. Spreader 310 converts the bits in the output signal of convolutional encoder 300 and transforms them into Manchester symbols (e.g., one symbol is converted or transformed into four chips).

As noted above, the output signal of spreader 310 is used to populate or provide the coefficients of correlator 175. When all coefficients are populated, the demodulated data associated with or corresponding to those coefficient are retrieved from RAM 185 and populated into correlator 175. In some embodiments, controller 180 repeats this process for early, late and current phases, and changes (or corrects or switches or updates) the address pointer (labeled as "RAM Address" output of controller 180) to the phase with the highest correlation. In some embodiments, this operation may be used conditionally to improve robustness of the receiver operation, as desired. For example, if the number of transitions in the coefficients is less than a threshold, then controller 180 would refrain from changing the address pointer. In addition, in some embodiments, when the difference between the highest correlation value and the second highest correlation value is below a threshold, controller 180 refrains from changing the address pointer.

In the particular case of receiving BLE-LR signals, the coefficients of correlator 175 are based on the expected transmission sequence (as transmitted, for example, over the air (or other transmission medium) transmission of the Access Address or sync word by a transmitter). Given that the sequence of the PDU is not known a priori, the sequence is derived from the received data stream output by Viterbi decoder 270 so that the estimate is reliably based on the coding gain. To arrive at the transmitted stream, the Manchester coding and spreading are reversed by using convolutional encoder 300 and spreader 310. As noted, the coefficients for correlator 175 are derived from the output signal of spreader 310.

When the coefficients for correlator 175 are populated, the associated signal (symbols stored in RAM 185) is retrieved from RAM 185 and is loaded into the correlator in early, late, and current phases. At this point, controller 180 causes the processing in LA circuit 240, despreader 250, and Viterbi decoder 270 of new samples from RAM 185 to be put on hold. Controller 180 can change or adjust the address pointer based on the output signal of correlator 175 for the early, late, and current phases. Once the adjustment is finished, the address pointer continues from where new data were put on hold, and correlator 175 is populated with new coefficients for the next tracking cycle.

In some embodiments, the magnitude output of Cordic 165 may be used to implement additional functionality or features. For example, in some embodiments, the magnitude output signal of Cordic 165 is used to derive a receive signal strength indication (RSSI) (after a linear to log conversion of the magnitude output signal), and may be used as input to an AGC circuit. In some embodiments, the magnitude output signal of Cordic 165 may be used to weight or scale the output signal of the likelihood approximation (LA) circuit 240 (described below in detail). To do some, in some embodiments, the magnitude output signal of Cordic 165 is also stored in memory 185, synchronously with the differentiated phase signal. The weighting can be done in various ways, as desired. For example, one may multiply the output signal of LA circuit 240 with the average magnitude of the two samples that were used for the differentiation operation, and provide the weighted result to despreader 250 or Viterbi decoder 270. As another example, an average magnitude may be established or calculated over several samples and subtract that from the average magnitude of the two samples that were used for the differentiation operation. The result of the subtraction can be multiplied with the result or output signal of LA circuit 240. The result of the multiplication can be provided to despreader 250 or Viterbi decoder 270. As another example, the average magnitude of the two samples that were used for the differentiation can be replaced with the sample with the lowest value of the two samples that were used for the differentiation.

Figure 6:
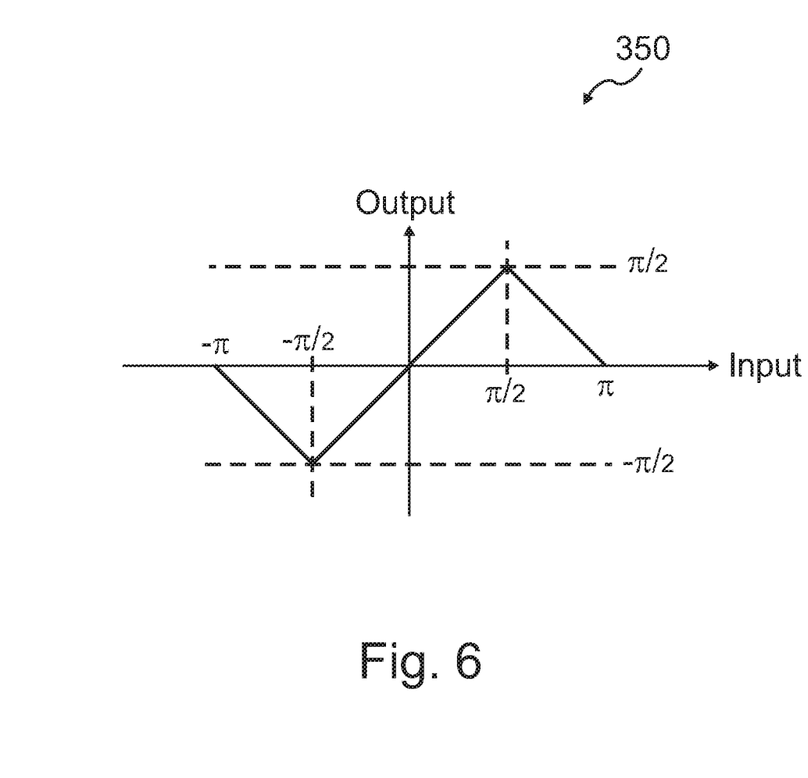
FIG. 6 shows a transfer function for a likelihood approximation circuit according to an exemplary embodiment.

As noted above, samples retrieved from RAM 185 are processed by LA circuit 240. FIG. 6 shows a transfer function for LA circuit 240 according to an exemplary embodiment. In other words, waveform 355 indicates how the output signal of LA circuit 240 varies in response to the changes in the input signal of LA circuit 240. LA circuit 240 acts to improve the likelihood characteristics for the input signal of Viterbi decoder 270. To do so, LA circuit 240 applies a non-linear distortion to the demodulated output. For example, referring to FIG. 6, when the modulation index is 0.5, the expected phase difference will be $$\frac{\pi}{2}.$$

In such a situation, more phase difference is not expected, so LA circuit 240 will reduce its output. For instance, for a phase difference exceeding $$\frac{\pi}{2}$$

the transfer function will reduce its output because it is less likely that the demodulated signal is valid. Note that, under ideal conditions, values of $$+\frac{\pi}{2} \text{ or } -\frac{\pi}{2}$$

are expected at the input of LA circuit 240. Those input values correspond to the peaks of waveform 355 in FIG. 6. In exemplary embodiments, the transfer function shown in FIG. 6 improves the receiver sensitivity by roughly 1.5 dB.

Note that FIG. 6 shows merely one example of a non-linear transfer function that may be used in LA circuit 240. Other distortion or non-linear functions may be used, depending on factors such as type of signals, design and performance specifications, etc., as persons of ordinary skill in the art will understand. For example, in some embodiments, a sinewave function may be used as the transfer function of LA circuit 240.

Figure 7:
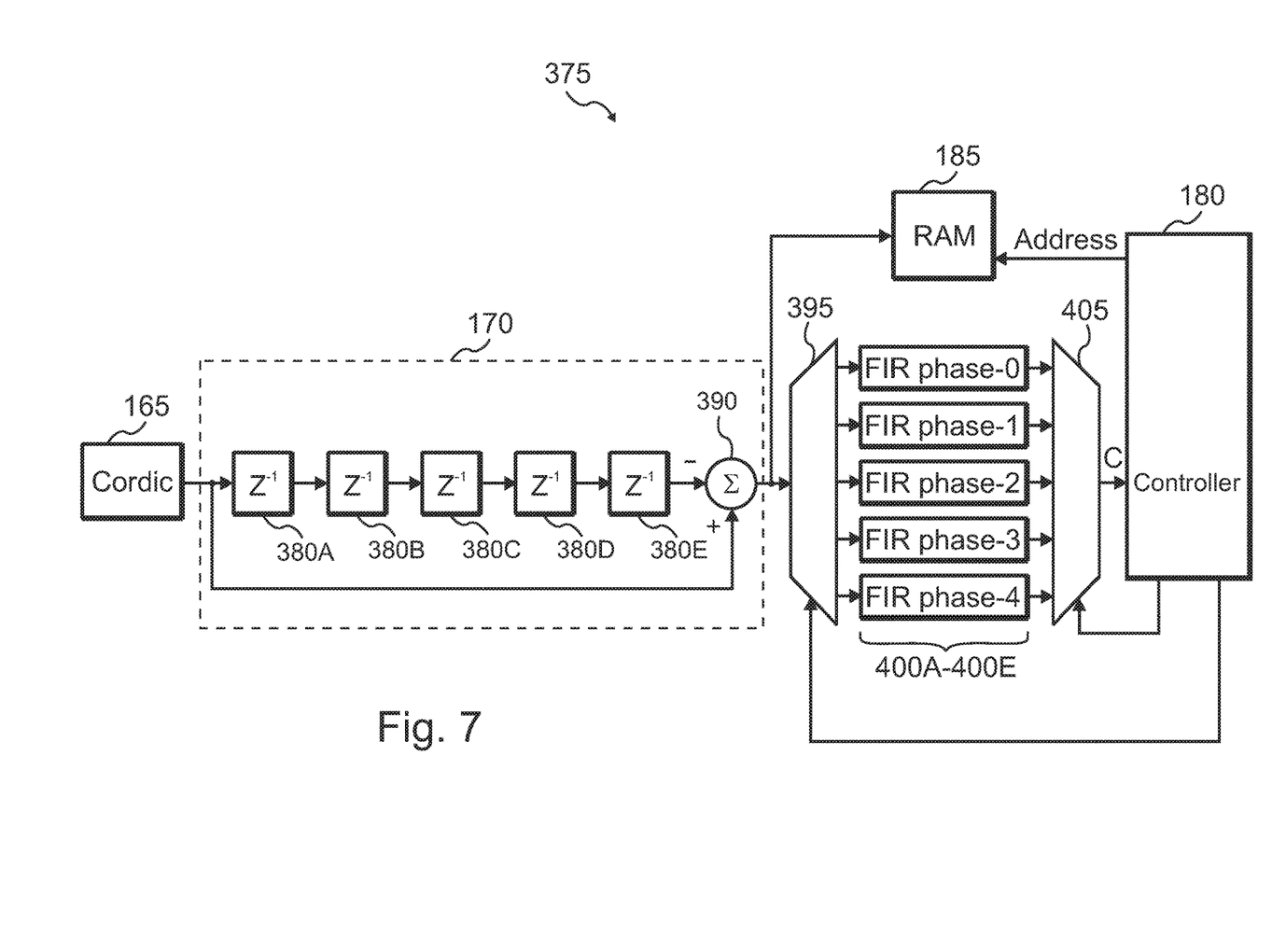
FIG. 7 depicts a circuit arrangement that includes a differentiator and a correlator according to an exemplary embodiment.

FIG. 7 depicts a circuit arrangement 375 that shows block diagrams of differentiator 170 and correlator 175 (see FIG. 6) according to an exemplary embodiment. The example shown corresponds to the situation where an over-sampling rate of 5 is used, i.e., 5 samples per symbol is the sampling rate used by Cordic 165. In the example shown, correlator 175 includes demultiplexer (DeMUX) 395, FIR filters 400A-400E (labeled as "FIR phase-0" through "FIR phase-4," respectively), and MUX 405. The output signal of correlator 175 (labeled "C" in FIG. 7) is provided to controller 180.

Differentiator 170 runs or is clocked at the sample rate. Differentiator 170 includes a cascade coupling of 5 delay circuits, labeled 380A-380E. The phase output of Cordic 165 drives the input of delay circuit 380A. The output of delay circuit 380A drives the input of delay circuit 380B, and so on. The output of delay circuit 380E drives the negative input of subtractor 390. The input signal of delay circuit 380A also drives the positive input of subtractor 390. Subtractor 390 subtracts the output of delay circuit 380E from the input signal of delay circuit 380A and provides the result as the output signal of differentiator 170.

The output of differentiator 170 drives the input of DeMUX 395. In response to a control signal from controller 180, DeMUX 395 provides its input signal to a corresponding one of FIR filters 400A-400E. FIR filters 400A-400E provide the correlation function described above, using coefficients that may be selected or populated as described above. Phase values of the input signal of differentiator 170 determine which of the FIR filters 400A-400E processes the signals provided to correlator 175. In other words, depending on the phase value, controller 180 provides the control signal to DeMUX 395 so that the output of differentiator 395 is provided to the corresponding one of FIR filters 400A-400E.

The outputs of FIR filters 400A-400E are provided to MUX 405. In response to a control signal from controller 180, MUX 405 provides one of the output signals of FIR filters 400A-400E as the output signal (labeled "C") of correlator 175. As noted, controller 180 detects when the output signal "C" peaks, and takes appropriate action. For example, in some embodiments, when output signal "C" exceeds a threshold, controller 180 may cause correlator 175 to run for several more samples and then select the peak correlation value from among the samples.

Figure 8:
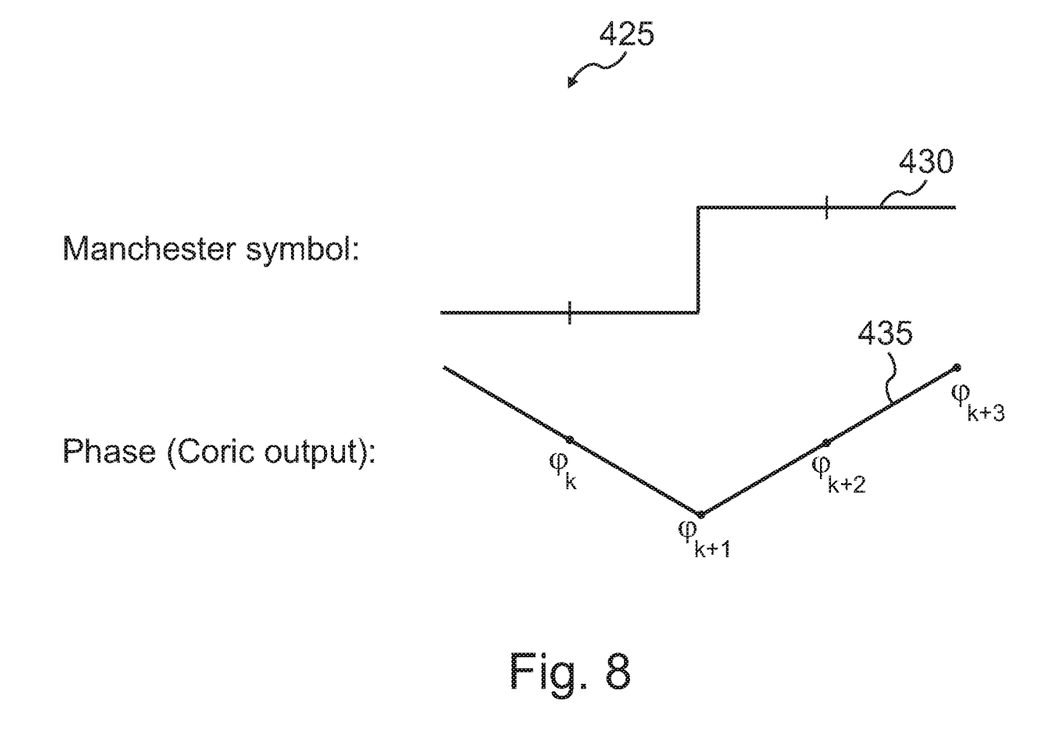
FIG. 8 illustrates a symbol and associated phase signal in a receiver according to an exemplary embodiment.
Figure 9:
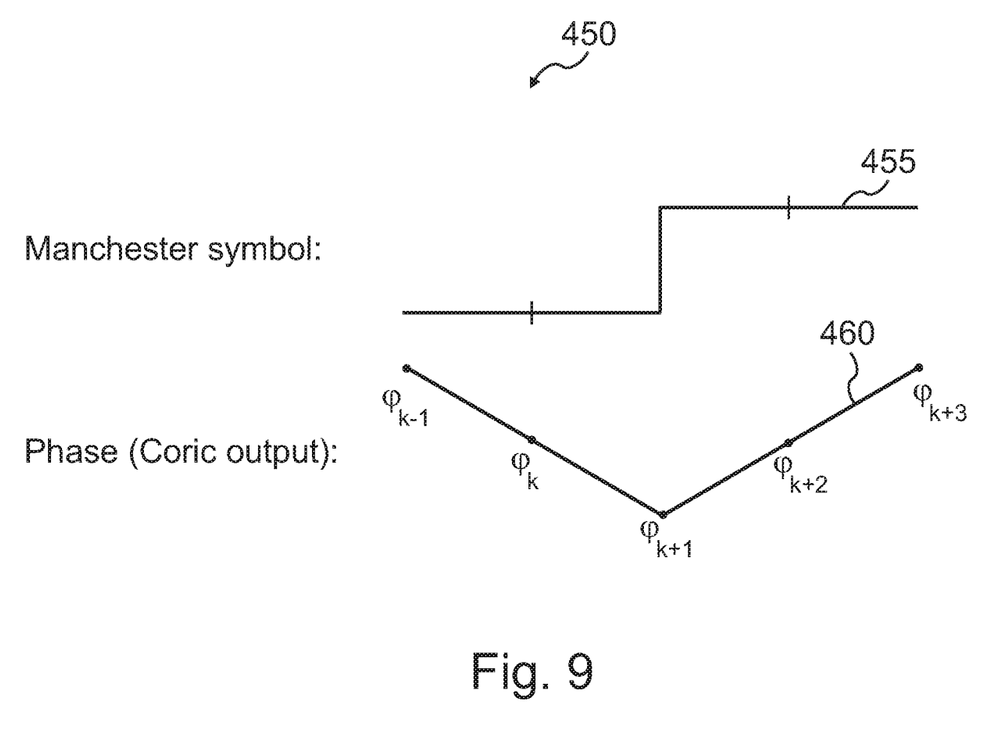
FIG. 9 shows a symbol and associated phase signal in a receiver according to an exemplary embodiment.

FIGS. 8 and 9 provide examples of operation of the circuit in FIG. 7. FIG. 8 illustrates a plot 425 of a BLE-LR symbol and associated phase signal in a receiver according to an exemplary embodiment. More specifically, FIG. 8 shows a Manchester symbol waveform 430 and the corresponding phase waveform 435 for the phase output of Cordic 165 (not shown). The output of correlator 175 (not shown) over one symbol may be expressed as: $(\varphi_{k+1}-\varphi k) C_0+(\varphi_{k+3}-\varphi_{k+2}) C_1$. For an expected "1" symbol, $C_0=-1$ and $C_1=+1$. Conversely, for an expected "0" symbol, $C_0=+1$ and $C_1=-1$.

FIG. 9 shows a plot 450 of another BLE-LR symbol and associated phase signal in a receiver according to an exemplary embodiment. Similar to FIG. 8, FIG. 9 illustrates a Manchester symbol waveform 455 and the corresponding phase waveform 460 for the phase output of Cordic 165 (not shown). The output of correlator 175 (not shown) over one symbol may be expressed as: $(\varphi_k-\varphi_{k-1}) C_0+(\varphi_{k+1}-\varphi_k) C_1+(\varphi_{k+2}-\varphi_{k+1}) C_3+(\varphi_{k+3}-\varphi_{k+2}) C_4$. For an expected "1" symbol, $C_0=C_1=-1$ and $C_3=C_4=+1$. Conversely, for an expected "0" symbol, $C_0=C_1=+1$ and $C_3=C_4=-1$.

Figure 10:
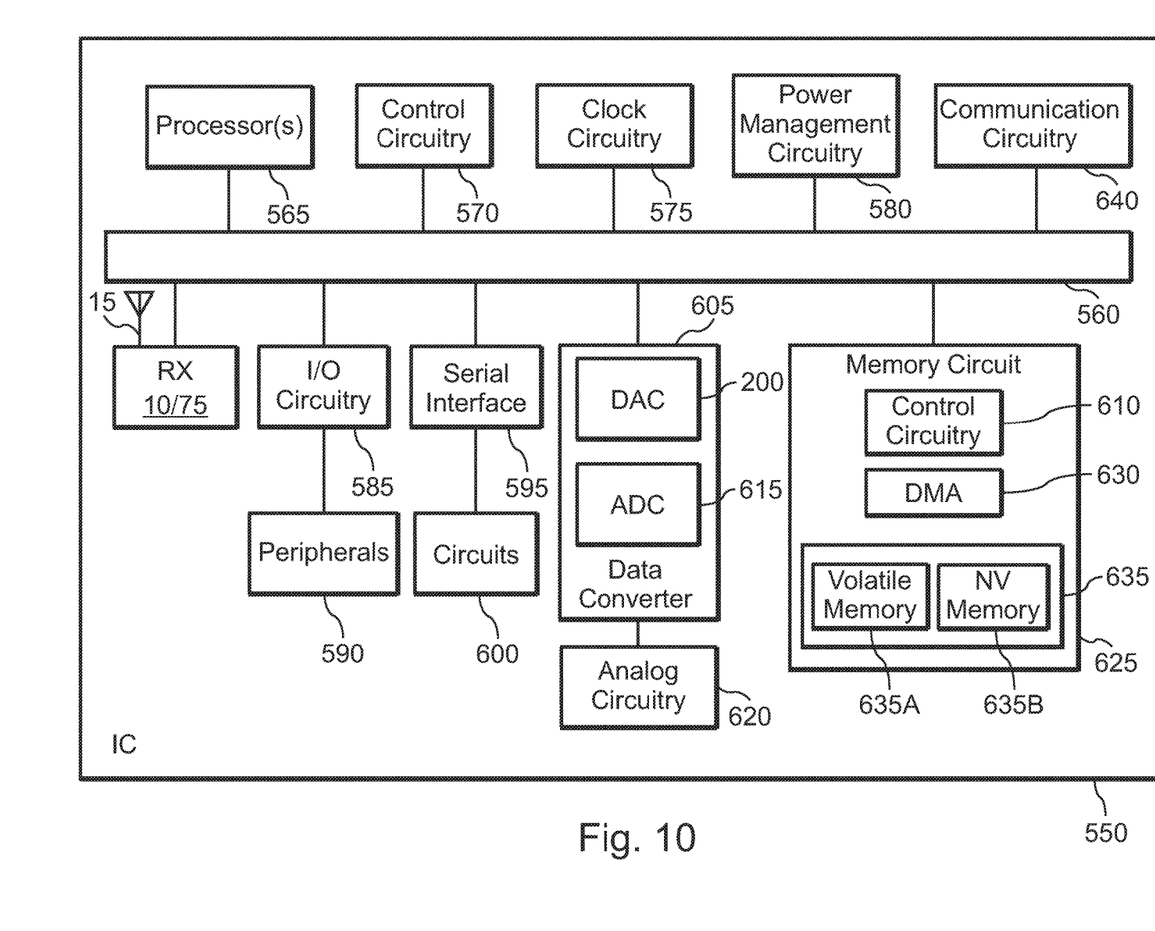
FIG. 10 depicts a block diagram of an IC according to an exemplary embodiment.

Receivers according to exemplary embodiments may be combined with other circuitry, for example, by integrating the receiver and signal processing, logic, or computing circuitry within an IC. FIG. 10 illustrates an IC 550, for example, a microcontroller unit (MCU), that combines a receiver with other circuit blocks according to an exemplary embodiment. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductors for communicating information, such as data, commands, status information, and the like.

IC 550 may include link 560 coupled to one or more processors 565, clock circuitry 575, and power management circuitry 580. In some embodiments, processor(s) 565 may include circuitry or blocks for providing computing functions, such as central-processing units (CPUs), arithmetic-logic units (ALUs), and the like. In some embodiments, in addition, or as an alternative, processor(s) 565 may include one or more digital signal processors (DSPs). The DSPs may provide a variety of signal processing functions, such as arithmetic functions, filtering, delay blocks, and the like, as desired. In some embodiments, functionality of parts of receiver 10/75, such as those described above, may be implemented or realized using some of the circuitry in processor(s) 565, as desired.

Referring again to FIG. 10, clock circuitry 575 may generate one or more clock signals that facilitate or control the timing of operations of one or more blocks in IC 550. Clock circuitry 575 may also control the timing of operations that use link 560. In some embodiments, clock circuitry 575 may provide one or more clock signals via link 560 to other blocks in IC 550.

In some embodiments, power management circuitry 580 may reduce an apparatus's (e.g., IC 550) clock speed, turn off the clock, reduce power, turn off power, or any combination of the foregoing with respect to part of a circuit or all components of a circuit. Further, power management circuitry 580 may turn on a clock, increase a clock rate, turn on power, increase power, or any combination of the foregoing in response to a transition from an inactive state to an active state (such as when processor(s) 565 make a transition from a low-power or idle or sleep state to a normal operating state).

Link 560 may couple to one or more circuits 600 through serial interface 595. Through serial interface 595, one or more circuits coupled to link 560 may communicate with circuits 600. Circuits 600 may communicate using one or more serial protocols, e.g., SMBUS, $I^2C$, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with other blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, etc.). Note that in some embodiments, some peripherals 590 may be external to IC 550. Examples include keypads, speakers, and the like. In some embodiments, with respect to some peripherals, I/O circuitry 585 may be bypassed. In such embodiments, some peripherals 590 may couple to and communicate with link 560 without using I/O circuitry 585. Note that in some embodiments, such peripherals may be external to IC 550, as described above.

Link 560 may couple to analog circuitry 620 via data converter 605. Data converter 405 may include one or more ADCs 615 and/or one or more DACs 200. The ADC(s) 615 receive analog signal(s) from analog circuitry 620, and convert the analog signal(s) to a digital format, which they communicate to one or more blocks coupled to link 560. Conversely, DAC(s) 200 receive one or more digital signals from one or more blocks coupled to link 560, and convert the digital signal(s) to an analog format. The analog signal(s) may be provided to circuitry within (e.g., analog circuitry 620) or circuitry external to IC 550, as desired. Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks, and information processing blocks, as desired.

Control circuitry 570 couples to link 560. Thus, control circuitry 570 may communicate with and/or control the operation of various blocks coupled to link 560. In addition or as an alternative, control circuitry 570 may facilitate communication or cooperation between various blocks coupled to link 560. In some embodiments, the functionality or circuitry of control circuits in receiver 10/75 (e.g., controller 170 or 250 described above) may be combined with or included with the functionality or circuitry of control circuitry 570, as desired.

Referring again to FIG. 10, in some embodiments, control circuitry 570 may initiate or respond to a reset operation. The reset operation may cause a reset of one or more blocks coupled to link 560, of IC 550, etc., as person of ordinary skill in the art will understand. For example, control circuitry 570 may cause receiver 10/75 to reset to an initial state. In exemplary embodiments, control circuitry 570 may include a variety of types and blocks of circuitry. In some embodiments, control circuitry 570 may include logic circuitry, FSMs, or other circuitry to perform a variety of operations, such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples include universal serial bus (USB), Ethernet, and the like. In exemplary embodiments, other communication protocols may be used, depending on factors such as specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc. In the embodiment shown, memory circuit 625 includes control circuitry 610, memory array 635, and direct memory access (DMA) 630. Control circuitry 610 controls or supervises various operations of memory circuit 625. For example, control circuitry 610 may provide a mechanism to perform memory read or write operations via link 360. In exemplary embodiments, control circuitry 610 may support various protocols, such as double data rate (DDR), DDR2, DDR3, and the like, as desired. In some embodiments, the memory read and/or write operations involve the use of one or more blocks in IC 550, such as processor(s) 565. DMA 630 allows increased performance of memory operations in some situations. More specifically, DMA 630 provides a mechanism for performing memory read and write operations directly between the source or destination of the data and memory circuit 625, rather than through blocks such as processor(s) 565.

Memory array 635 may include a variety of memory circuits or blocks. In the embodiment shown, memory array 635 includes volatile memory 635A and non-volatile (NV) memory 635B. In some embodiments, memory array 635 may include volatile memory 635A. In some embodiments, memory array 635 may include NV memory 635B. NV memory 635B may be used for storing information related to performance or configuration of one or more blocks in IC 550. For example, NV memory 635B may store configuration information related to various operations of receiver 10/75 and/or to initial or ongoing configuration or control of receiver 10/75, as desired.

As described above in detail, receiver 10/75 receives RF signals via antenna 15, and processes those signals. The resulting data signals are provided to one or more blocks of circuitry in IC 550 via link 560. Furthermore, various blocks of circuitry in IC 550 may be used to process the received data and to generate additional data or signals, which may be used to control other circuitry, etc. In some embodiments, a transmitter (not shown) may be included in IC 550. In such configurations, the transmitter may transmit information generated or processed in IC 550, such as information derived from, based on, or related to data received by receiver 10/75. Thus, sophisticated control and communication subsystems, blocks, circuits, or systems for processing information and/or control may be implemented.

Various circuits and blocks described above and used in exemplary embodiments may be implemented in a variety of ways and using a variety of circuit elements or blocks. For example, Cordic 165, differentiator 170, correlator 175, controller 180, RAM 185, accumulator 210, storage circuit 220, differentiator 230, LA circuit 240, despreader 250, adder 260, Viterbi decoder 270, access address decoder 280, rate indicator detector 290, convolutional encoder 300, spreader 310, MUX 320, delay circuit 380A-380E, adder 390, DeMUX 395, FIR filters 400A-400E, and MUX 405 may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, etc., as desired, and as persons of ordinary skill in the art will understand. In addition, analog circuitry or mixed-signal circuitry or both may be included, for instance, power converters, discrete devices (transistors, capacitors, resistors, inductors, diodes, etc.), and the like, as desired. The analog circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus comprising:
a radio frequency (RF) receiver comprising:
a differentiator that differentiates a phase signal to generate a differentiated signal;
a correlator that receives and correlates the differentiated signal to generate a correlated signal;
a memory that receives and stores the differentiated signal,
wherein samples of the differentiated signal are provided to the correlator and to the memory synchronously; and
a controller that selects centers of symbols encoded in an RF signal provided to the RF receiver by deriving a memory address pointer by detecting a point in time when the correlated signal reaches a peak.

2. The apparatus according to claim 1, wherein the RF receiver further comprises a Coordinate Rotation Digital Computer (Cordic) circuit that receives and processes a baseband signal derived from the RF signal to generate the phase signal.

3. The apparatus according to claim 1, wherein the RF receiver further comprises decoding circuitry that receives stored samples from the memory and decodes the stored samples to retrieve information transmitted via the RF signal.

4. The apparatus according to claim 3, wherein the decoding circuitry comprises a Viterbi decoder that receives signals derived from samples stored in the memory.

5. The apparatus according to claim 4, wherein the Viterbi decoder is coupled in a timing tracking loop comprising a convolutional encoder that receives an output signal of the Viterbi decoder.

6. The apparatus according to claim 4, wherein the RF receiver further comprises a likelihood approximation circuit that generates an output signal by applying distortion to samples retrieved from the memory, and wherein the Viterbi decoder receives signals derived from the output signal of the likelihood approximation circuit.

7. The apparatus according to claim 1, wherein the correlator comprises a plurality of finite impulse response (FIR) filters.

8. The apparatus according to claim 7, wherein a plurality of coefficients corresponding to the plurality of FIR filters are derived from a decoded signal derived from samples retrieved from the memory.

9. An integrated circuit (IC), comprising:
a radio frequency (RF) receiver, comprising:
a differentiator that differentiates a phase signal to generate a differentiated signal;
a correlator that receives and correlates the differentiated signal to generate a correlated signal;
a memory that receives and stores the differentiated signal; and
a likelihood approximation circuit that applies a transfer function to samples stored in the memory to generate distorted samples for use for decoding information coded in the phase signal.

10. The apparatus according to claim 9, wherein the transfer function comprises a non-linear transfer function.

11. The apparatus according to claim 10, wherein the non-linear transfer function comprises a sinewave function.

12. The apparatus according to claim 9, wherein the RF receiver further comprises:
a Viterbi decoder that receives a signal derived from the distorted samples and decodes information coded in the phase signal; and
a despreader that applies Manchester despreading to the distorted samples to generate the signal derived from the distorted samples.

13. The apparatus according to claim 9, wherein the RF receiver further comprises a Coordinate Rotation Digital Computer (Cordic) circuit that generates the phase signal and a magnitude signal, wherein the magnitude signal is used to derive a receive signal strength indication (RSSI) or to weight the distorted samples generated by the likelihood approximation circuit.

14. The apparatus according to claim 9, wherein the correlator comprises a plurality of finite impulse response (FIR) filters.

15. The apparatus according to claim 14, wherein a plurality of coefficients corresponding to the plurality of FIR filters are derived from a decoded signal derived from samples retrieved from the memory.

16. A method of receiving radio frequency (RF) signals in an RF receiver, the method comprising:
differentiating a phase signal to generate a differentiated signal;
correlating the differentiated signal in a correlator to generate a correlated signal;
receiving and storing in a memory the differentiated signal,
wherein samples of the differentiated signal are provided to the correlator and to the memory synchronously; and
selecting centers of symbols encoded in an RF signal provided to the RF receiver by deriving a memory address pointer by detecting a point in time when the correlated signal reaches a peak.

17. The method according to claim 16, further comprising processing a baseband signal derived from an RF signal in a Coordinate Rotation Digital Computer (Cordic) circuit to generate the phase signal.

18. The method according to claim 16, further comprising:
receiving stored samples from the memory; and
decoding the stored samples to retrieve information transmitted via an RF signal provided to the RF receiver.

19. The method according to claim 18, wherein decoding the stored samples to retrieve the information transmitted via the RF signal provided to the RF receiver comprises decoding the stored samples using a Viterbi decoder coupled in a timing tracking loop.

20. The method according to claim 16, wherein correlating the differentiated signal to generate the correlated signal comprises filtering the differentiated signal using a plurality of finite impulse response (FIR) filters having a plurality of coefficients derived from a decoded signal derived from samples retrieved from the memory.

* * * * *